US012581108B2

(12) United States Patent
Bonsor-Matthews et al.

(10) Patent No.: US 12,581,108 B2
(45) Date of Patent: Mar. 17, 2026

(54) IMAGE SENSOR PROCESSING CORE FOR VIDEO PRE-ANALYSIS

(71) Applicants: Advanced Micro Devices, Inc., Santa Clara, CA (US); ATI Technologies ULC, Markham (CA)

(72) Inventors: Jonathan Philip Bonsor-Matthews, Milton Keynes (GB); James B. Fry, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 18/752,015

(22) Filed: Jun. 24, 2024

(65) Prior Publication Data

US 2025/0392741 A1    Dec. 25, 2025

(51) Int. Cl.
| | |
|---|---|
| *H04N 19/51* | (2014.01) |
| *G06T 3/40* | (2024.01) |
| *G06T 5/92* | (2024.01) |
| *G06T 7/70* | (2017.01) |
| *H04N 1/60* | (2006.01) |

(52) U.S. Cl.
CPC .............. *H04N 19/51* (2014.11); *G06T 3/40* (2013.01); *G06T 5/92* (2024.01); *G06T 7/70* (2017.01); *H04N 1/60* (2013.01); *G06T 2207/10024* (2013.01)

(58) Field of Classification Search
CPC ........................... H04N 19/149; H04N 19/154
See application file for complete search history.

(56) References Cited

U.S. PATENT DOCUMENTS

| | | | | |
|---|---|---|---|---|
| 2008/0088858 | A1* | 4/2008 | Marcu ................... | H04N 23/80 |
| | | | | 358/1.6 |
| 2012/0050563 | A1* | 3/2012 | Cote ...................... | H04N 23/70 |
| | | | | 348/223.1 |
| 2018/0233028 | A1* | 8/2018 | Rhoads .................. | G06F 16/58 |
| 2019/0213434 | A1* | 7/2019 | Zamfir ................. | G06V 40/165 |
| 2022/0094943 | A1* | 3/2022 | Suzuki .................. | H04N 19/85 |
| 2022/0312019 | A1* | 9/2022 | Kubota ................. | G06V 10/82 |
| 2023/0127009 | A1* | 4/2023 | Gilmutdinov ....... | G06F 18/2414 |
| | | | | 382/156 |

(Continued)

OTHER PUBLICATIONS

"Direct Encoding for Sampled Color Image Sensors with Localized Inverse"—C. Lee and S. Baek, 978-1-5090-1000-4/1 6/$31.00 © 2016 IEEE (Year: 2016).*

(Continued)

*Primary Examiner* — Mainul Hasan
(74) *Attorney, Agent, or Firm* — Volpe Koenig

(57) ABSTRACT

A computing device and a method for encoding video at a computing device is provided. The computing device comprises memory, an image signal processor in communication with the memory and an encoder. The image signal processor is configured to convert data of images of a video stream as part of image sensor processing pipeline; and for an image of the video stream, pre-analyze, as part of the image sensor processing pipeline, converted data of one or more images of the video stream prior to encoding the frame. The encoder is configured to encode images of the video stream using information resulting from the pre-encoding analysis of the converted data. The encoded images are decoded and displayed.

20 Claims, 7 Drawing Sheets

(56) References Cited

U.S. PATENT DOCUMENTS

| | | | | |
|---|---|---|---|---|
| 2024/0414351 | A1* | 12/2024 | Tanaka | H04N 19/115 |
| 2025/0008227 | A1* | 1/2025 | Vacquerie | H04N 23/617 |

OTHER PUBLICATIONS

"Lossless White Balance for Improved Lossless CFA Image and Video Compression"—Yeejin Lee and Keigo Hirakawa, IEEE Transactions on Image Processing, vol. 31, 2022 (Year: 2022).*
"Motion Imagery Metadata Standards Assist in Object and Activity Classification"—Young, 2010 IEEE 39th Applied Imagery Pattern Recognition Workshop (AIPR) (Year: 2010).*

* cited by examiner

700

702 Obtain Image Data of Video Stream

704 Perform Pre-encoding Analysis Using ISP as Part of Image Sensor Pipeline

706 Encode Image

IMAGE SENSOR PROCESSING CORE FOR VIDEO PRE-ANALYSIS

BACKGROUND

Video encoding often includes a pre-encoding analysis step that analyzes video data and/or other operational aspects to inform the rest of the encoding. There are many ways to implement pre-encoding analysis, and efficiently performing such analysis is an important aspect to video encoding operations.

BRIEF DESCRIPTION OF THE DRAWINGS

A more detailed understanding can be had from the following description, given by way of example in conjunction with the accompanying drawings wherein.

DETAILED DESCRIPTION

Figure 1:
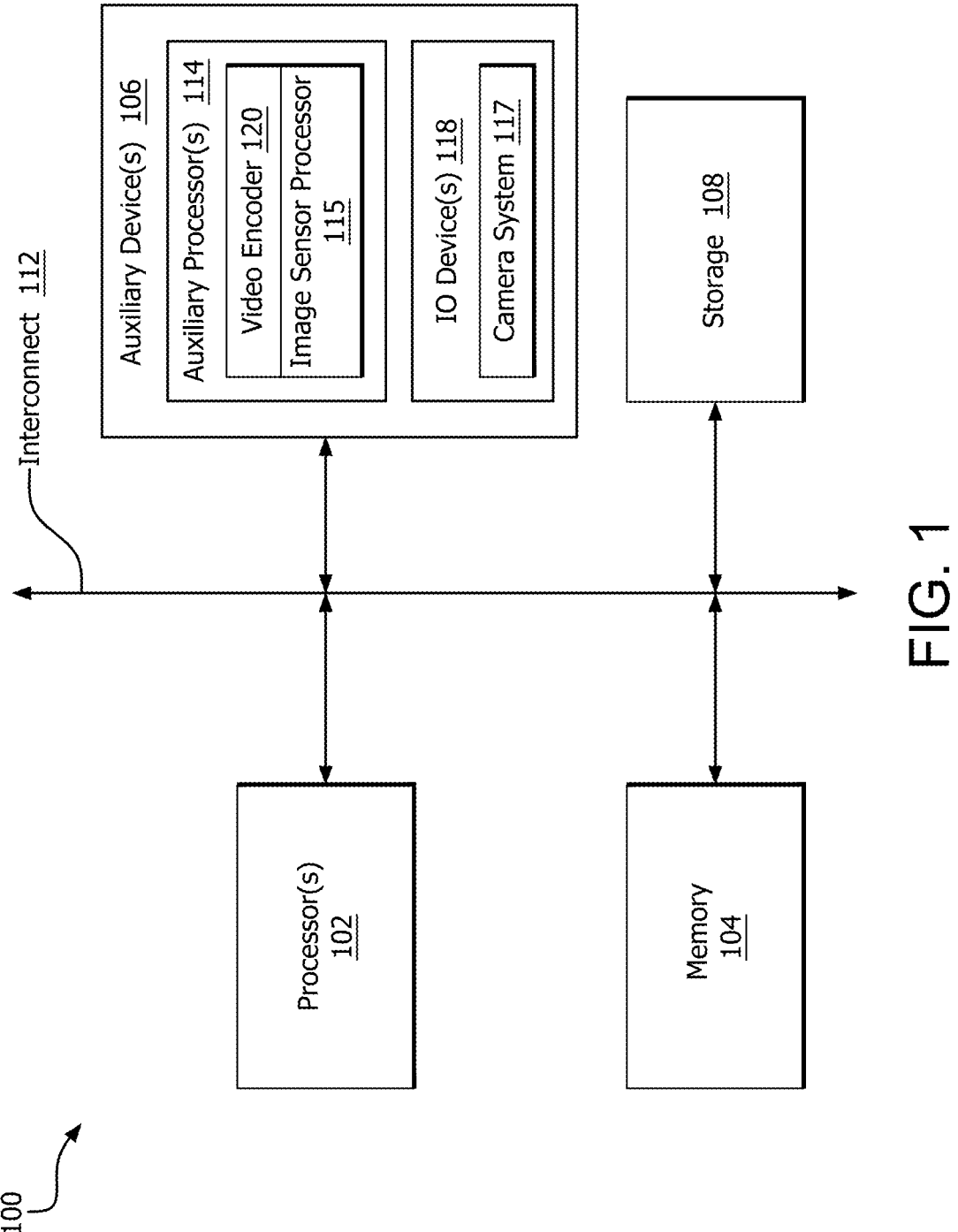
FIG. 1 is a block diagram of an example computing device in which one or more features of the present disclosure can be implemented.

Video encoders compress the image data (pixel data) of a video stream to reduce the storage cost (e.g., amount of memory used to store bits representing the image data) and bandwidth cost (e.g., bitrate at which the image data is distributed) of a device. The higher the quality of the image data, the more storage and bandwidth is needed. Accordingly, encoders typically make decisions on how to encode (e.g., compress) the image data based on reducing the cost (storage cost and bandwidth cost) while maintaining a level of quality of the video (i.e., cost-quality trade-off). The decisions typically include selecting between a large number of candidates (e.g., frame/block partition candidates, transform size candidates, transform type candidates, and motion estimation candidates) to encode the image data.

Each image (frame) of a video stream typically includes divided regions (e.g., blocks), each having information indicating a size of the block, color and brightness of pixels of the block, and movement of the block relative to blocks of other images of the video stream. Accordingly, blocks can be encoded differently from each other. For example, larger blocks are used when less detail (e.g., edges, color and motion) is needed to represent the block. Larger blocks allow higher compression (e.g., higher compression ratio) of their pixel data than the compression of pixel data in smaller blocks, but therefore produce a lower level of quality than lesser compressed smaller blocks.

Recently, video encoding has been evolving to take advantage of metadata from prior computations to make more informed decisions for encoding each image (e.g., a frame representing the image) in a video stream. For example, an image is encoded by performing a pre-encoding analysis of the image (analyzing the pixel data of the frame or a reference frame prior to encoding the image) and then using results of the pre-encoding analysis as hints (e.g., as metadata) to reduce the number of candidates from which to select.

While this pre-encoding analysis facilitates a reduction in the number of candidates, performing the pre-encoding analysis also incurs additional cost (e.g., time and power). For example, some conventional techniques encode an image by performing the pre-encoding analysis via multiple passes by a processor (e.g., a first pass to perform a trial encode of the image data and extract statistics from the encoding, and then a second pass for the final encode). However, because each pass incurs time and power, the multiple passes increase the overall resource cost. Other conventional techniques perform the pre-encoding analysis by using a CPU or GPU. However, the cost of using a CPU or GPU to perform the pre-analysis is very high. Artificial intelligence (AI) based techniques can also be used to limit the number of candidates. However, these AI techniques require adding processors (e.g., an inference processing unit (IPU)) to a device, which increases the overall cost.

Features of the present disclosure efficiently encode (e.g., compress) image data of a video stream by utilizing the image signal processor (ISP) of a device instead of using other more costly processors (e.g. GPU or main CPU). That is, the area (e.g., silicon area) occupied by the hardware logic of the ISP to implement the pre-analysis of the image sensor processing data is less than the area occupied by the logic of a GPU or main CPU, thereby reducing the power consumed to perform the pre-analysis.

As described in more detail herein, the ISP is, for example, an auxiliary processing device which can include one or more auxiliary processors (e.g., an inference processor such as an IPU, a processor used to perform linear algebra operations (a linear algebra processor), a dedicated CPU or another auxiliary processor dedicated to the ISP) configured to perform the pre-analysis, or any other type of circuitry such as custom programmable or fixed-function circuitry.

The pre-analysis for encoding an image (frame) is, in some situations, performed more efficiently by using the ISP of a camera sub-system, which also processes image data (e.g., mobile industry processor interface (MIPI) frames) by performing different functions in stages of the image sensor pipeline (e.g., converting RAW image data into digital format such as RGB format or YUV format, channel resampling, filtering such as Bayer filtering, color interpolation, color correction, color space conversion, noise reduction, demosaicing, auto exposure, auto focus, high dynamic range (HDR) correction, image sharpening and scaling) to be encoded. The ISP performs pre-encoding analysis on data (e.g., a portion of pixel data, such as a macroblock, tile, or other portion) retrieved from a camera or from another source. The pre-analysis is performed, by the ISP, for image data acquired from a variety of sources, such as camera image data (e.g., video captured by a camera at a computing device) and non-camera image data (e.g., video games, screen sharing, and video transcoding, such as video editing). Examples of pre-analysis include linear algebra operations (e.g., image transformations), classical image analysis (e.g., edge detection, computing variance and gradient of pixel intensity and color, etc.) and AI analysis (e.g., an embedded neural network).

Utilizing the ISP to perform the pre-encoding analysis, a higher quality to lower bitrate output can be provided, especially in cases where processors and resources (e.g., memory) of a device are constrained. In addition, using the ISP to perform the pre-encoding analysis provides a lower power solution compared to other processing components (e.g., the ISP can perform the same pre-analysis and provide the same information (hints) as other processing components (e.g., main CPU and GPU) with reduced power consumption). Further, using the ISP to perform the pre-encoding analysis utilizes typically underused (e.g., wasted) on-chip resources for the pre-encoding analysis.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106 and storage 108. An interconnect 112, which can be a bus, a combination of buses, and/or any other communication component, communicatively links the processor(s) 102, the memory 104, the auxiliary device (s) 106 and the storage 108.

In various alternatives, the processor(s) 102 include a CPU, a GPU, a CPU and GPU located on the same die or within the same chip, or one or more processor cores, wherein each processor core can be a CPU, a GPU, or a neural processor. It should be noted that even though the processor(s) 102 are said to optionally include a GPU, it is possible that the processor(s) 102 either do not include a GPU or do include a GPU, and that in either case, the system 100 can have a GPU separate from the processor even where the processor(s) 102 include a GPU. In various alternatives, at least part of the memory 104 is located on the same die as one or more of the processor(s) 102, such as on the same chip or in an interposer arrangement, and/or at least part of the memory 104 is located separately from the processor(s) 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The auxiliary device (s) 106 include, without limitation, one or more auxiliary processors 114, and/or one or more input/output ("IO") devices. The auxiliary processor(s) 114 include, without limitation, a processing unit capable of executing instructions, such as a CPU, a GPU, a parallel processing unit capable of performing compute shader operations in a single-instruction-multiple-data form, multimedia accelerators such as video encoding or decoding accelerators, or any other processor.

For example, as shown in FIG. 1, auxiliary processor(s) 114 include a video encoder 120 and an image sensor processor 115. Other examples of auxiliary processors (not shown) include processors configured to perform one or more specific tasks, such as for example linear algebra computations (e.g., matrix multiplication), color conversion, and scaling. As described in more detail herein, in various alternatives, features of the disclosure can be implemented using one or more of these auxiliary processors 114 shown in FIG. 1.

Any auxiliary processor 114 is implementable as a programmable processor that executes instructions, a fixed function processor that processes data according to fixed hardware circuitry, a combination thereof, or any other type of processor. In addition, although processor(s) 102 and auxiliary device(s) 106 are shown separately in FIG. 1, in some examples, processor(s) 102 and auxiliary device(s) 106 may be on the same chip.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals). In some examples, the one or more IO devices 118 includes a camera system 117. Components of the camera system 117 include components for capturing an image (e.g., an image sensor). The image sensor processor 115, which is separate from the camera system 117, processes raw image data captured from the camera system 117 for subsequent use (e.g., storage, display, or other uses). In some examples, the camera system 117 has its own image sensor processor which processors raw sensor data and provides that processed data to memory 104 for subsequent access by the image sensor processor 115. In some examples, the camera system 117 encodes its captured frames in an encoded format such as motion JPEG (MJPEG) and the image sensor processor 115 performs pre-analysis for encoding that is a part of transcoding on such encoded data.

Figures 2A, 2B:
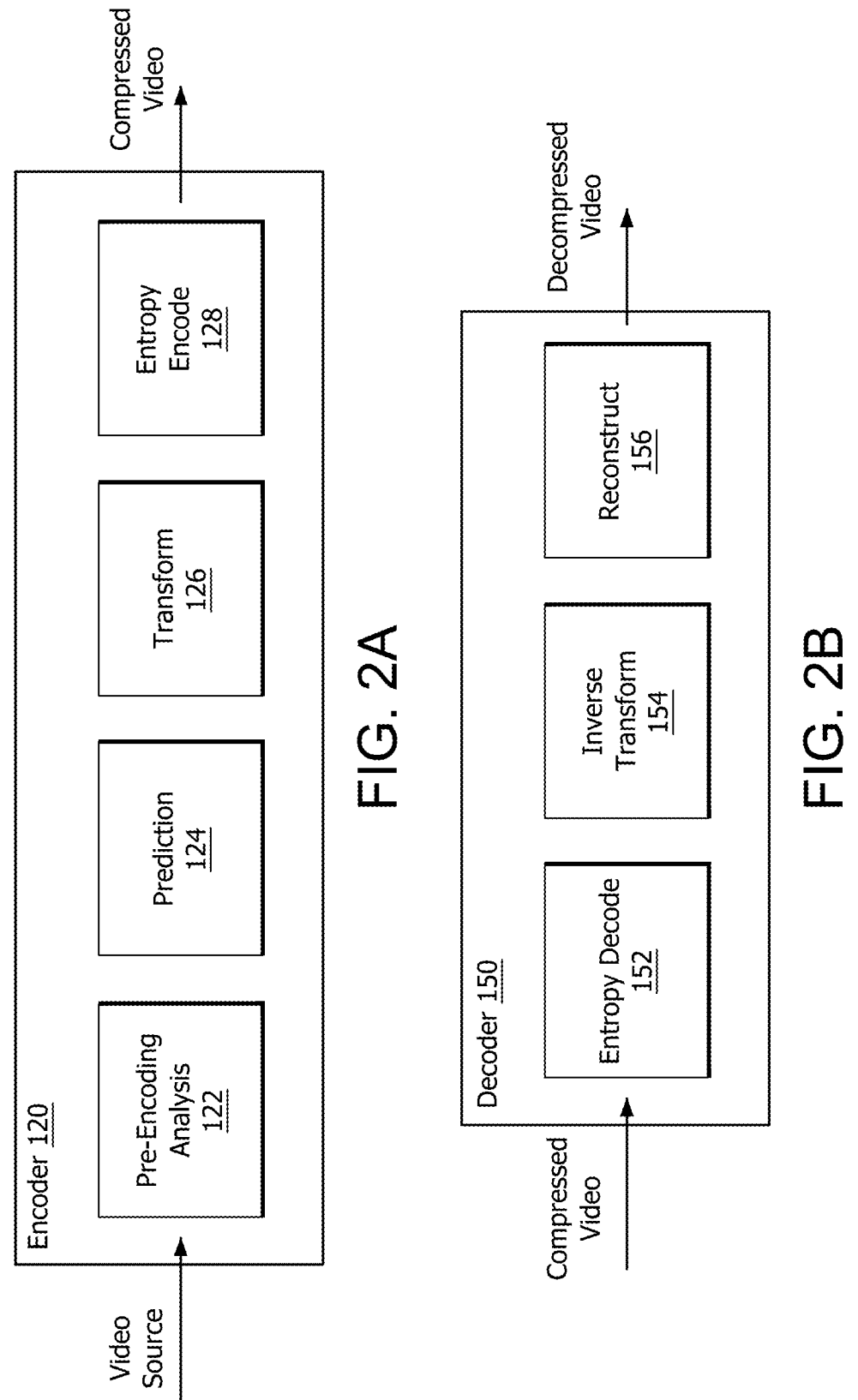
FIG. 2A is a block diagram of an encoder, according to an example.
FIG. 2B is a block diagram of a decoder, according to an example.

FIG. 2A presents a detailed view of the encoder 120 of FIG. 1, according to an example. The encoder 120 accepts source video, encodes the source video to produce compressed video (or "encoded video"), and outputs the compressed video for subsequent use (e.g., storage, playback, or other use). The encoder 120 includes a pre-encoding analysis block 122, a prediction block 124, a transform block 126, and an entropy encode block 128. In some alternatives, the encoder 120 implements one or more of a variety of video encoding standards (such as MPEG2, H.264, H.265, AV1, or other standards), with the prediction block 124, transform block 126, and entropy encode block 128 performing respective portions of those standards and the pre-encoding analysis block 122 not necessarily being a part of a standard. In other alternatives, the encoder 120 implements a video encoding technique that is not a part of any standard.

The prediction block 124 performs prediction techniques to reduce the amount of explicit information needed to be stored for a particular frame. Various prediction techniques are possible. One example of a prediction technique is a motion prediction based inter-prediction technique, where a block in the current frame is compared with different groups of pixels in the same or a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with the best score such as the lowest sum of absolute differences is deemed to be a match. After finding a matching block, the current block is subtracted from the matching block to obtain a residual. The residual is further encoded by the transform block 126 and the entropy encode block 128 and the block is stored as the encoded residual plus the motion vector in the compressed video.

The transform block 126 performs an encoding step which is typically though not necessarily lossy, and converts the data of the block into a compressed format. An example transform that is typically used is a discrete cosine transform (DCT). The discrete cosine transform converts data for the block (where prediction is used, the residual of the block) into a sum of weighted visual patterns, where the visual patterns are distinguished by the frequency of visual varia-tions in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coeffi-cients. A lower QP requires more bits to store, because more bits are needed for the larger number of available coefficient values, and a higher QP requires fewer bits. Visually, a higher QP is associated with less detail and a lower QP is associated with more detail.

The entropy encode block 128 performs entropy coding on the coefficients of the blocks. Entropy coding is a lossless form of compression. Examples of entropy coding include context-adaptive variable-length coding and context-based adaptive binary arithmetic coding. In general, the entropy coding involves reducing the amount of data required to store a set of data by reducing the number of possible values that can be stored in that set of data. The entropy coded transform coefficients describing the residuals, the motion vectors, and other information such as per-block QPs are output and stored or transmitted as the encoded video.

The pre-encoding analysis block 122 performs various operations relevant to the other parts of the encoder (e.g., prediction block 124, transform block 126, and entropy encode block 128). In various examples, the pre-encoding analysis block 122 provides information to such other parts in order to inform operations of such other parts. In some examples, the pre-encoding analysis block 122 performs operations that limit the possible parameters that can be selected by the rest of the encoder. More specifically, encod-ing generally involves testing out encoding on units of video frames (e.g., blocks) with different parameters and selecting a "optimal" or "desired" result corresponding to a particular set of parameters. The pre-encoding analysis block 122 can perform analysis on incoming data to limit the possible set of parameters to a smaller group of possible parameters.

In some examples, the pre-encoding analysis block 122 provides information to the transform block 126 to cause the transform block 126 to select QPs for blocks in a manner that reflects the analysis performed by the pre-encoding analysis block 122. In one example, the pre-encoding analy-sis block 122 analyzes the content of a frame of video to be encoded to determine QP adjustments for various areas within the frame, to better distribute the bit budget of the frame. In various other examples, the pre-encoding analysis block 122 performs any other technically feasible operation for affecting the operations of the encoder, in particular, the prediction block 124, transform block 126, or entropy encode block 128. As described elsewhere herein, in some examples, operations of the pre-encoding analysis block 122 are performed by the image sensor processor 115.

FIG. 2B represents a decoder 150 for decoding com-pressed data generated by an encoder such as the encoder 120, according to an example. The decoder 150 includes an entropy decoder 152, an inverse transform block 154, and a reconstruct block 156. The entropy decoder 152 converts the entropy encoded information in the compressed video, such as compressed quantized transform coefficients, into raw (non-entropy-coded) quantized transform coefficients. The inverse transform block 154 converts the quantized trans-form coefficients into the residuals. The reconstruct block 156 obtains the predicted block based on the motion vector and adds the residuals to the predicted block to reconstruct the block.

Note that the operations described for FIGS. 2A and 2B only represent a small subset of the operations that encoder and decoder use. In various implementations, the encoder and decoder use various alternative or additional operations.

Figure 3:
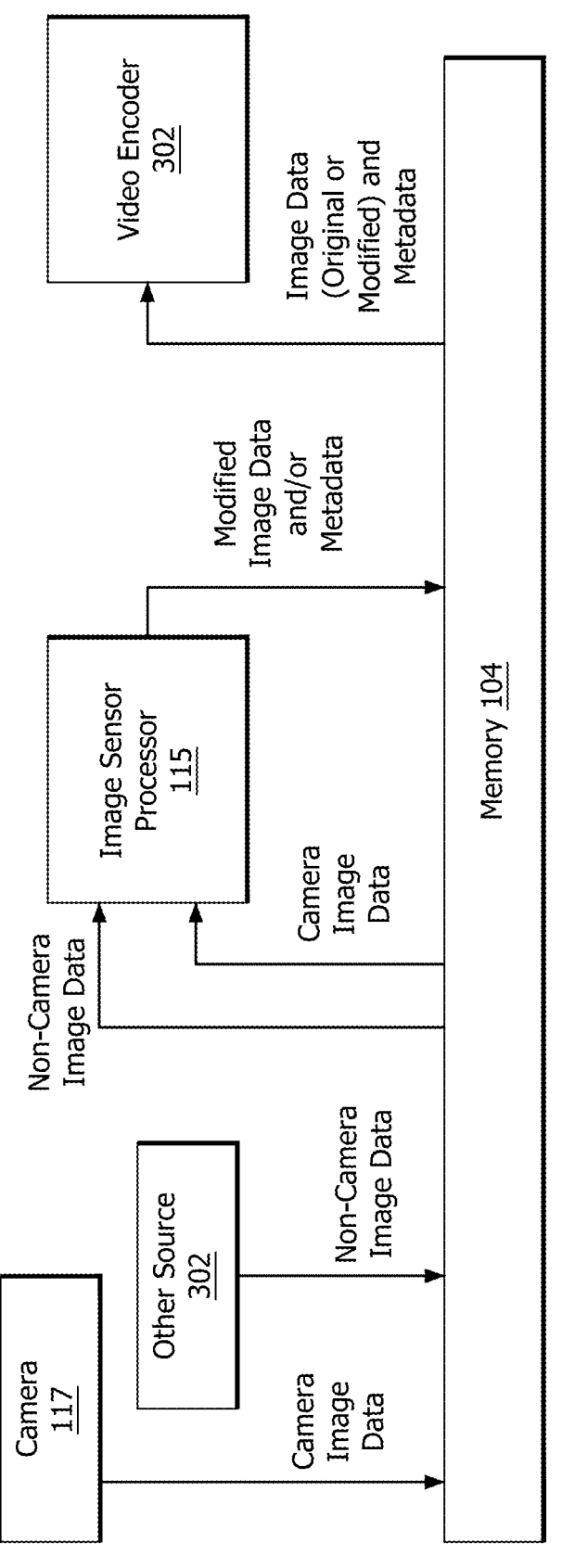
FIG. 3 is a block diagram illustrating an example flow of data through an image sensor pipeline to a video encoder, according to an example.

FIG. 3 is a block diagram illustrating the flow of data from a source of image data, through the image sensor processor 115 to a video encoder 120, according to features of the disclosure.

As shown in FIG. 3, the image sensor processor 115 receives and processes either camera image data and non-camera image data. That is, the image sensor processor 115 processes image data acquired from a variety of sources, such as camera image data (e.g., video captured by the camera 117) and/or non-camera image data captured from another source 302 (e.g., data from video games, data for video transcoding, data for video editing, and data for screen sharing). The camera image data and non-camera image data that are stored in memory 104, are accessed and processed by the image sensor processor 115.

As described in more detail below, in addition to per-forming various functions for converting RAW image data of a video stream into digital format (e.g., such as Bayer transformation, noise reduction, demosaicing, auto expo-sure, auto focus, high dynamic range (HDR) correction, and image sharpening), the image sensor processor 115 is also utilized to perform pre-encoding analysis of video data for the purpose of video encoding. In other words, the image sensor processor 115 is utilized to perform at least a part of the functionality of the pre-encoding analysis 122 of the encoder 120 of FIG. 2A. Thus, in some examples, the image sensor processor 115 is utilized both for image sensor processing for a camera system 117 as well as for pre-encoding analysis 122 of a video encoder 120.

In some examples, the video stream processed by the image sensor processor 115 for pre-encoding analysis 122 is a series of images captured by the camera system 117 (of FIG. 1). In other examples, the video stream is derived from a different source, such as a non-volatile storage, in memory, received via a network, or derived from any other source. Once images (e.g., frames) are processed by the pre-encod-ing analysis operations performed by the image sensor processor 115, the images are then encoded, by encoder 120, using information (e.g., metadata) resulting from the pre-encoding analysis. In some examples, the encoded image data is later decoded and displayed at a display device (e.g., one of the IO devices 118 or a display on another device in a network (not shown)), but this display is not necessary and the processed data can instead be stored to memory or storage and/or transmitted across a network to another computer system.

Figure 4:
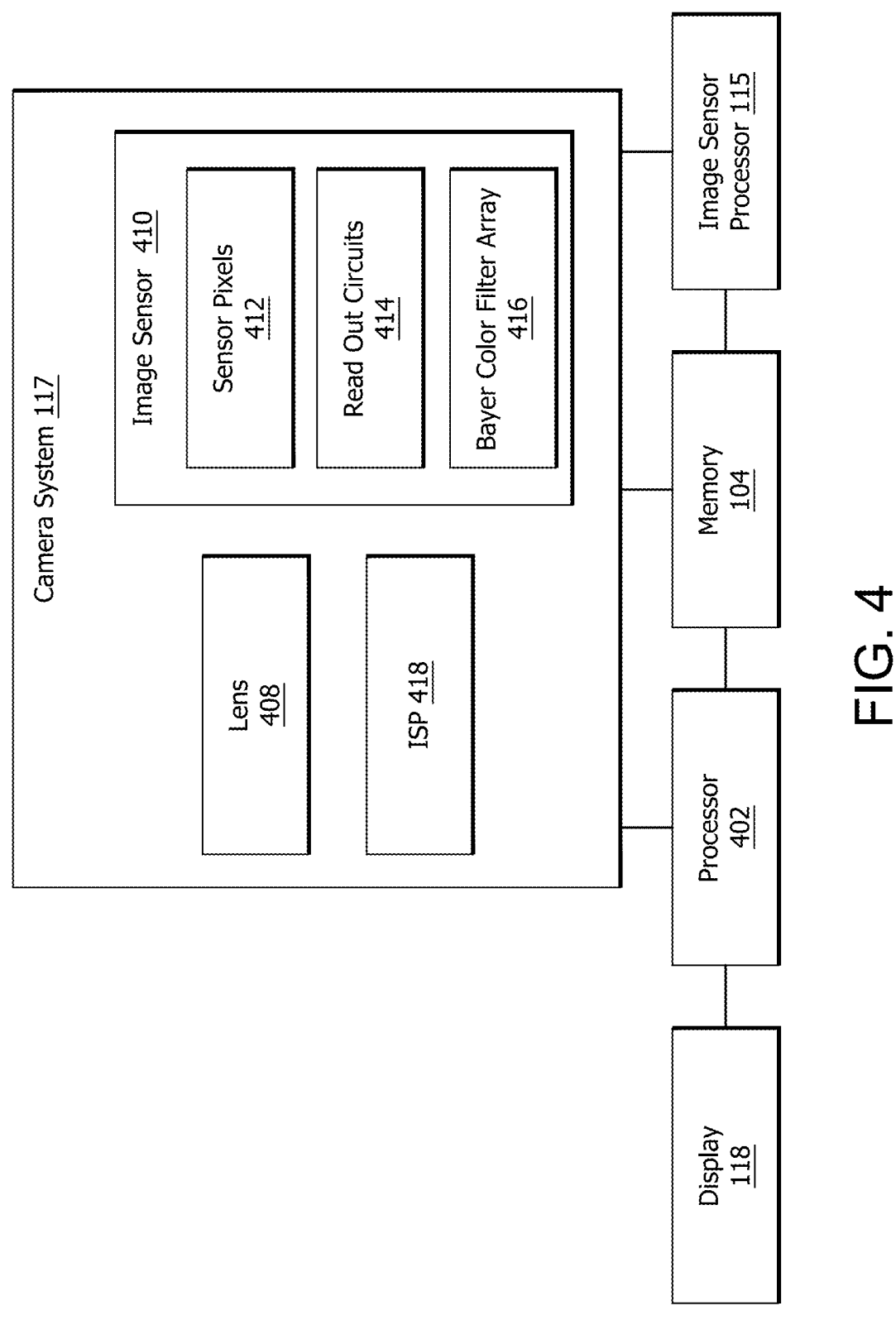
FIG. 4 is a block diagram illustrating an example of camera subsystem components in a computing device in which one or more features of the disclosure can be implemented.

FIG. 4 is a block diagram illustrating an example of camera subsystem components in a computing device in which one or more features of the disclosure can be implemented. As shown in FIG. 4, processing device 400 (which is an example of device 100) includes processor 402 (which is an example of processor 102), memory 104 and camera 117. Camera 117 includes lens 408, image sensor 410 and, optionally, image sensor processor 418. It should be understood that the image sensor processor 418 of the camera is not the same as the image sensor processor 115, and that in some implementations, the camera system 117 does not include an image sensor processor 418. In implementations in which the camera system 117 includes the image sensor processor 418, the image sensor processor 418 performs processing of raw data obtained by the image sensor 410 to generate image or video for further use. In implementations in which an image sensor processor 418 is not part of the camera system 117, the image sensor processor 115 processes the raw image data received from the image sensor 410 to obtain processed data. In some examples, the image sensor processor 418 of the camera system 117 processes and encodes data from the image sensor 410 to generate encoded video (e.g., encoded as motion JPEG video) and the image sensor processor performs pre-encoding analysis for transcoding of that video into a different format (e.g., H.264). In any case, the image sensor processor 115 is capable of processing raw data of the image sensor 410 into image data usable by the rest of the device 400.

Image sensor 410 incudes sensor pixels 412, read-out circuits 414 (e.g., including an analog to digital converter (ADC) circuit) and Bayer color filter array 416. Lens 408 includes a single lens or an assembly of lenses which collects light reflected from objects and/or light directly transmitted from illuminants. Image sensor 410 is, for example, a complementary metal-oxide-semiconductor (CMOS) based image sensor, which includes an array of cells, each corresponding to a pixel of an image (i.e., frame). Image sensor 410 is configured to expose the pixels to light passing through lens 408. The light passed through the corresponding color filter array 416 at each cell and captured at each cell is transformed into an electric signal. The accumulated charge of the signal for each cell is read out, during a read-out time, and sent to read out circuits 414, which converts this signal into digital values.

Figure 5:
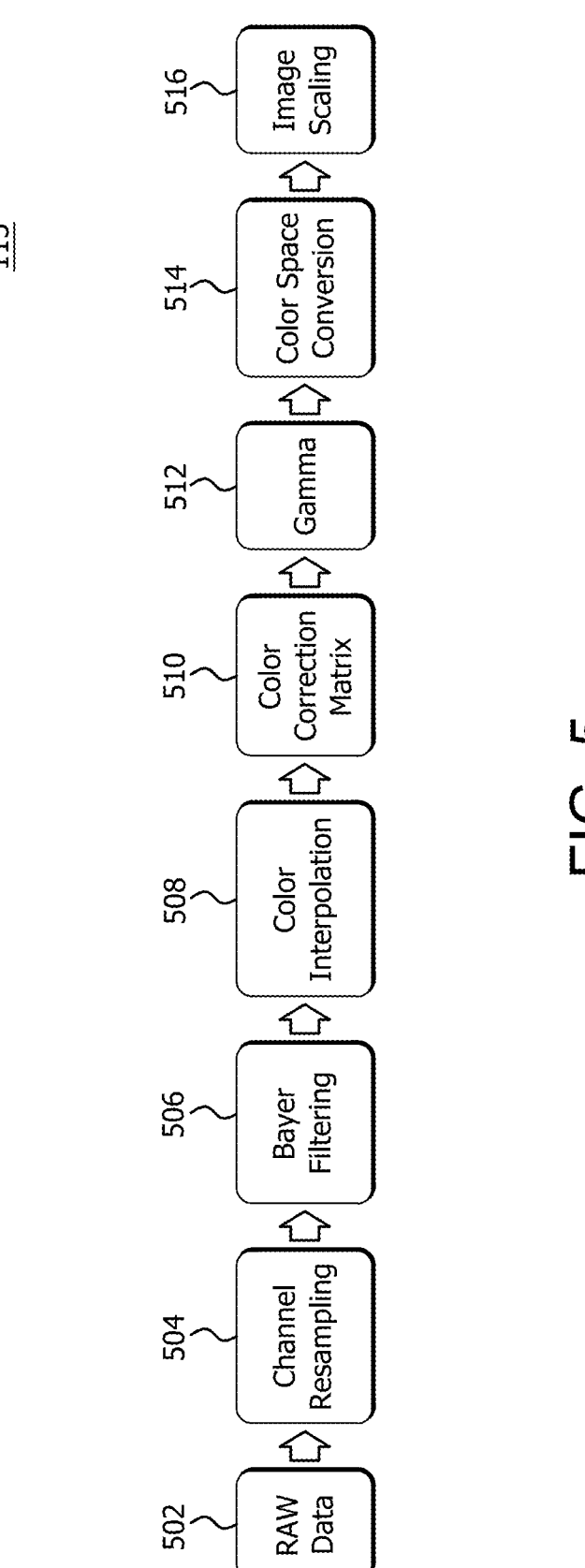
FIG. 5 is a block diagram illustrating an example flow of processing images via an image sensor pipeline according to features of the present disclosure.

FIG. 5 is a block diagram illustrating an example flow of processing images via an image sensor pipeline implemented by the image sensor processor 115, according to features of the present disclosure. Blocks 502-516 illustrate an example of conventional processing as part of the image sensor pipeline to convert (i.e., modify) the RAW image data from the sensor into user-consumable image data. This conversion includes various stages in which different functions are performed to convert the RAW image data from the sensor into a digital image format. For example, as shown at block 502 at FIG. 5, raw image data is received from the camera. At step 504, the image sensor processor 115 performs channel resampling to partially correct chromatic aberration. At step 506, the image sensor processor 115 performs Bayer filtering for demosaicing, which converts a single channel Bayer raw image into a three-color image. At step 508, the image sensor processor 115 performs color interpolation, to remove the artefacts introduced by the Bayer pattern. At step 510, the image sensor processor 115 performs white balance and color correction by applying a matrix. This step transforms the data to adjust the colors to fit a particular output color space. Gamma encoding 512 applies a tonal response curve to the linear sensor data. S-curves or shoulders may be added to prevent highlights from burning out. At step 514, the image sensor processor 115 performs color space conversion. Color space conversion involves conversion of the color space of the image sensor (e.g., RGB) to a different color space. At step 516, the image sensor pipeline performs image scaling, converting the resolution of the image output from the image sensor into a different format.

The stages (e.g., functions) shown at blocks 504-516 in FIG. 5 are merely an example of stages in an image sensor pipeline for simplified explanation purposes. In addition, the stages shown in FIG. 5 can be performed in an order different from the order shown in FIG. 5.

In addition to performing typical functions as part of the image sensor pipeline 134 (e.g., functions illustrated at blocks 502-516), the ISP 115 is configured and used to perform pre-encoding analysis on the data (e.g., a portion of pixel data, such as a macroblock, tile, or other portion) for video processing. In some examples, one or more stages of the ISP 115 performs pre-encoding analysis on data output from the image sensor pipeline. That is, features of the present disclosure utilize the ISP 115 to perform the pre-encoding analysis on the data output from one or more stages of the image sensor pipeline and provide information (e.g., hints as metadata) to efficiently encode (e.g., compress) image data of a video stream. More particularly, in some examples, the camera system 117 captures images by capturing raw image data, and processing the raw image data to a processed image format using an image sensor processor 115 as would normally occur with a digital camera. Then, that same image sensor processor 115, rather than another processor, performs pre-encoding analysis on these generated images, for the pre-encoding analysis portion 122 of a video encoder 120. In some examples, the output of that pre-encoding analysis, as well as the processed images, themselves, are then sent to an encoder 120 (e.g., the portions after the pre-encoding analysis 122) for further processing into a video.

The image sensor processor 115 has a number of processing resources that are useful for performing the described pre-encoding analysis. Such processing resources are shown and described with respect to FIG. 6.

Figure 6:
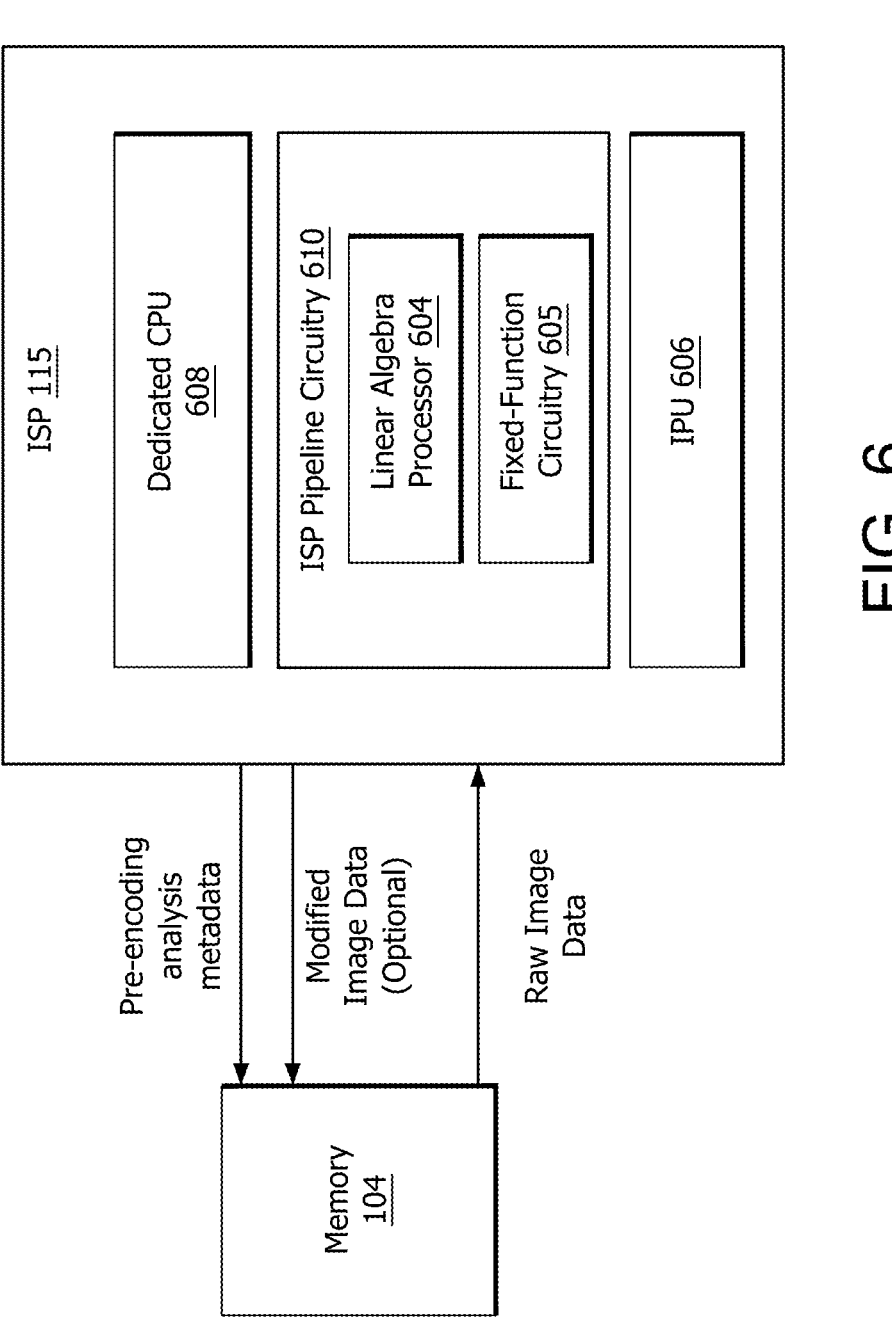
FIG. 6 is a block diagram illustrating components of a computing device in which one or more features of the disclosure can be implemented, according to an example.

FIG. 6 is a block diagram illustrating components of an example computing device 600 in which one or more features of the disclosure can be implemented. The computing device 600 is an altered example of the device 100 of FIG. 1, where the image sensor processor 115 is not within a camera system (e.g., camera system 117). As shown in FIG. 6, the computing device 600 includes memory 104 and ISP 115. In various examples, the ISP 115 includes one or more hardware components each configured to execute one or more functions of the pipeline of FIG. 5 (e.g., fixed function and programmable hardware configured to perform the functions shown at blocks 502-516 of image sensor pipeline at FIG. 5). For example, as shown in FIG. 6, the image sensor processor 115 includes its own internal hardware components, such as one or more dedicated central processing units ("CPUs") 608, ISP pipeline circuitry 610, which includes one or more linear algebra processor(s) 604 and fixed-function circuitry 605, and inference processing unit ("IPU") 606, configured to execute one or more functions of image sensor pipeline of FIG. 5.

In some examples, the ISP 115 is not directly connected to a data fabric bus (e.g., bus connecting the GPU cores to other peripherals, such as a memory controller and I/O hub). Instead, in some examples, the ISP 115 lies behind shared PCIe ("peripheral component interconnect express") infrastructure which exposes the ISP 115 to software as a PCIe sub-device (e.g., of a GPU). In some examples, the ISP 115 shares memory access infrastructure and hardware with the GPU, but its operation, processing, and functionality is separate and distinct from the GPU. The ISP 115 does not use the GPU shader or SIMD functionality and processes pixel data using its own internal fixed-function hardware (e.g., linear algebra processor 604, fixed-function circuitry 605, IPU 606, and dedicated CPU 608).

In some examples, the captured images (frames—e.g., captured from the capture system 117) or frames obtained from memory and not derived from a camera (e.g., camera system 117) are received by the ISP 115 via either a MIPI interface or a buffer residing in memory (e.g., memory 104), neither of which are directly dependent on GPU processing functionality. For example, the ISP 115 processes the frame data (e.g., pixel data in input buffers) using its internal hardware and provides the resulting processed frames to an output buffer without any involvement by a GPU or CPU. The processed frame data can then be provided, for example, to another processor of the auxiliary device 106 (e.g., a GPU) to perform any additional processing (e.g., graphics processing, user interface UI design) on the images (frames).

The ISP 115 is configured to perform the pre-analysis of image data more efficiently (e.g., less power consumption) than other more costly processing components (e.g., GPU and main CPU—not the dedicated CPU 608). Therefore, the area (e.g., silicon area) occupied by the hardware logic of the ISP to implement the pre-analysis of the image sensor processing data is less than the area occupied by the logic of a GPU or main CPU, thereby reducing the power consumed to perform the pre-analysis. It should be understood that although a GPU or CPU is sometimes referred to (e.g., "the ISP 115 performs the pre-encoding analysis for video encoding rather than a CPU or GPU"), this does not necessarily mean that the system in which the ISP 115 performs these actions actually includes a CPU or a GPU. Instead, this should be taken to mean that such a system can be built or designed without such a CPU or GPU, and can use the ISP 115 rather than a CPU or GPU for pre-encoding analysis, thus reducing the amount of area needed to implement such a system, as such a processor does not necessarily need to be included.

To efficiently encode the image data of a video stream, features of the disclosure utilize the ISP 115 (e.g., one or more of the linear algebra processor 604, fixed-function circuitry 605, the IPU 606, and/or the dedicated CPU 608) to perform pre-encoding analysis of an image instead of using other more expensive processors of the auxiliary device 106 (e.g. GPU or main CPU 608). For example, RAW image data (e.g., mobile industry processor interface (MIPI) frames) captured by the image capture device 117 and non-camera image data (e.g., image data from video games, video transcoding, such as video editing, and screen sharing) are stored in memory 104 and processed (e.g., by one or more of linear algebra processor 604, fixed-function circuitry 605, IPU 606, and dedicated CPU 608) to generate output data. The output data (e.g., modified data) is then pre-analyzed by the ISP 115 for pre-encoding analysis for video encoding. The ISP 115 determines, from the pre-analyzing of the converted data, information (e.g., hints) which are used to efficiently encode the image data as video.

Several aspects of the ISP 115 pipeline (e.g., that shown in FIG. 5) are useful for pre-encoding analysis. In one example, pre-encoding analysis, which is a type of image processing, utilizes the linear algebra processor 604 to perform various image related operations. Many types of image processing perform linear algebra. More specifically, linear algebra involves multiplication of vectors or matrices by other vectors or matrices. Image processing, such as that used in pre-encoding analysis, also uses linear algebra and thus can utilize the linear algebra processing 604 of the ISP 115 directly. In addition, any of the individual operations of FIG. 5 can be useful for pre-encoding analysis. Thus, in some examples, the pre-encoding analysis (e.g., of the image encoder 120) provides data to a block of the pipeline of FIG. 5 which performs its assigned function on that data and provides the appropriate output. The pre-encoding analysis selects any function of the pipeline of FIG. 5, and processes any data through such function to obtain an output. In some examples, the pre-encoding analysis chains multiple such functions together in any technically feasible order. In some examples, the pre-encoding analysis also utilizes the other resources of the ISP 115, such as using the IPU 606 or the dedicated CPU 608, to perform other operations for pre-encoding analysis. In some examples, the ISP 115 includes a face detection algorithm that is based on machine learning (e.g., includes a trained artificial intelligence model). One use for such an algorithm in the ISP 115 is to perform face-centric auto-focus, where the ISP 115 controls a camera's focus distance to focus on a face detected in an image captured by a camera. In some examples, such a face-detection auto-focus algorithm, implemented in the IPU 606, the IPU 606 detects faces in captured images and adjusts the focus distance based on the face. In some examples, this same face-detection auto-focus algorithm is used during pre-encoding analysis to detect the location of faces and adjust parameters of the encoding based on those locations. In an example, the pre-encoding analysis increases detail in areas that include faces (for example by decreasing the QP for such areas). In yet other examples, the pre-encoding analysis uses the dedicated CPU 608 to perform any of a variety of operations. Note that use of the CPU 608, ISP pipeline circuitry 610, and/or IPU 606 generally consumes less energy that performing corresponding functionality on a CPU 102 or a GPU.

Figure 7:
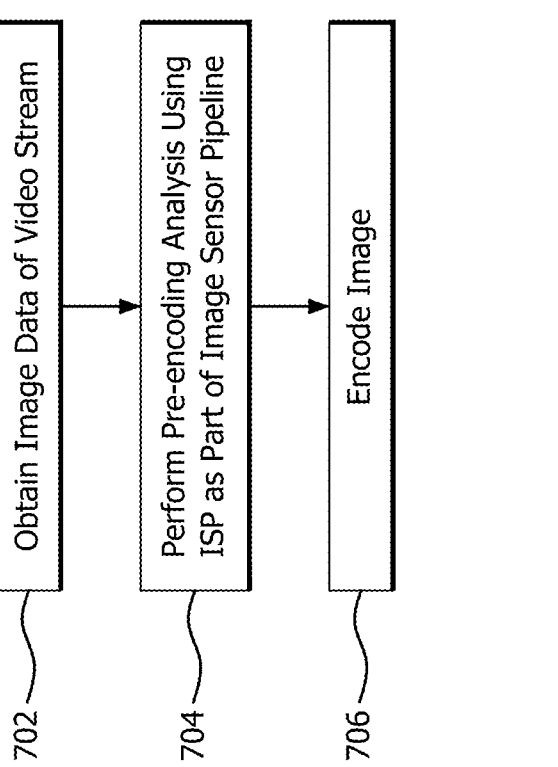
FIG. 7 is a flow diagram illustrating an example method of performing pre-encoding analysis.

FIG. 7 is a flow chart illustrating an example method 700 of video encoding according to features of the present disclosure. Although described with respect to the system of FIGS. 1-6, those of skill in the art will understand that any system, configured to perform the steps of the method 700 in any technically feasible order, falls within the scope of the present disclosure.

As shown at step 702, the image sensor processor 115 obtains image data for a video stream. The image sensor processor 115 receives this data from any technically feasible source. In some examples, a camera (e.g., camera system 117) provides raw image data as the image data. In some examples, raw image data is stored in memory (e.g., memory 104). In some examples, raw image data is decoded from other encoded video and then stored in memory as part of a transcoding operation. In some such examples, a camera includes its own image sensor processor that processes data from a camera to generate encoded video and the image sensor processor 115 outside of the camera performs pre-encoding analysis for transcoding of that video to a different format. In other examples, the image sensor processor 115 obtains image data from memory that is placed there in any technically feasible manner and by any component of the system that the image sensor processor 115 is within.

At step 704, the image signal processor 115 performs pre-encoding analysis. In an example, the image signal processor 115 performs such pre-encoding analysis on the data obtained at step 702. In various examples, the image signal processor 115 processes the frame data (e.g., pixel data in input buffers) using its internal hardware (e.g., using one or more of ISP pipeline circuitry 610, IPU 606, dedicated CPU 608, and one or more additional auxiliary processors 114). In various examples, this step involves performing any combination of the operations of the image signal pipeline (FIG. 5). In some examples, this step includes performing other operations that are not necessarily part of the image signal pipeline of FIG. 5, but that can be performed on the hardware of the ISP 115 illustrated in FIG. 6.

At step 706, the encoder 120 performs encoding based on the pre-encoding analysis performed at step 704. For example, based on the results of the pre-encoding analysis of the data, the encoder 120 encodes raw images to video, where the encoding uses the results of the output of the pre-encoding analysis.

Examples of information, resulting from the pre-analysis, used to efficiently encode the image include, but are not limited to, information indicating an importance level of one or more regions of an image, information indicating the location of one or more objects in the image, information indicating motion estimation of one or more objects in the image, information indicating one or more types of content in the image (e.g., face, natural video, generated video, text, and other types of content), information indicating where complexity is in the image (e.g., discontinuities in brightness, color, or another pixel parameter). Again, this information is used to encode the video.

In an example, with regard to information indicating an importance level, the image signal processor 115 determines that a portion of an image is more important than other regions of the image (e.g., a face in a video call, the object of focus in a game, the static text in a screen share). The encoder 120 then compresses a portion of the image based on its indicated importance level resulting from the pre-encoding analysis. That is, the encoder 120 uses lower compression ratios to encode regions of the image indicated as having higher importance levels and uses higher compression ratios to encode regions of the image indicated as having lower importance levels. Accordingly, the importance level information can be used to control the bit-rate at which the image data is distributed (lower compression ratio results in a higher bit-rate and higher quality) can be controlled to reduce the cost (bandwidth cost and storage cost) as much as possible while maintaining a level of quality of the video (i.e., cost-quality trade-off). Any number of importance levels can be used to compress the images.

With regard to information indicating a location of an object in the image, the location information can be used to determine partitioning of the image during the encoding process. For example, based on the pre-encoding analysis, the image signal processor 115 determines the locations (e.g., which pixels) in the image which include objects. Then, during the encoding process, the image is partitioned (divided) using blocks or tiles such that the boundaries of a tile or block do not, where possible, divide the object in the image (i.e., each object is contained in a block or tile).

With regard to information indicating motion estimation of one or more objects in the image, the image signal processor 115 determines motion estimation information (e.g., information indicating an estimated movement and location of the object of interest in the current frame to be encoded) based on the locations of an object (e.g. a face in a video conference, the mouse cursor in a screen share, an moving object in a video game) in one or more previous frames, and the image is encoded using the motion estimation information.

Utilizing the image signal processor 115 to perform the pre-encoding analysis of the for encoding the video reduces the silicon area (instead of adding additional processors) and also reduces leakage power when additional processors are not being used for low power use cases by keeping the processors in separate power and clock domains.

Utilizing the image signal processor 115 to perform the pre-encoding analysis as part of the image sensor processing pipeline, also facilitates a better quality to bitrate output, especially in cases where processors and resources (e.g., memory) of a device are constrained. In addition, utilizing the ISP to perform the pre-analysis provides a lower power solution than other more costly processing components (e.g., GPU or main CPU). That is, the area (e.g., silicon area) occupied by the hardware logic of the image signal processor 115 to implement the pre-analysis of the image sensor processing data is less than the area occupied by the logic of a GPU or main CPU, thereby reducing the power consumed to perform the pre-analysis. Further, utilizing the image signal processor 115 to perform the pre-encoding analysis also utilizes typically underused (e.g., wasted) resources (e.g., regions of memory or logic gates) as part of the image sensor processing pipeline.

It should be understood that many variations are possible based on the disclosure herein. Although features and elements are described above in particular combinations, each feature or element can be used alone without the other features and elements or in various combinations with or without other features and elements.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, the encoder 120, the decoder 150, the image sensor processor 115 (including, for example, the dedicated CPU 608, ISP pipeline circuitry 610, linear algebra processor 604, fixed-function circuitry 605, and IPU 606), are implemented fully in hardware, fully in software executing on processing units, or as a combination thereof. In various examples, any of the hardware described herein includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of video encoding, the method comprising:
performing, at an image sensor processor configured to process raw image sensor data, a pre-encoding analysis on input video data to generate encoding hint metadata, wherein the encoding hint metadata comprises at least one of: a per-region importance map, an object mask identifying one or more objects in an image of the input video data, or motion information for the one or more objects; and
transmitting, by the image sensor processor, the hint metadata and the input video data to an encoder, wherein the encoder is configured to encoded the input video data based on the encoding hint metadata.

2. The method of claim 1, wherein the pre-encoding analysis comprises performing one or more of determining an importance level of one or more regions of an image of the input video data, determining a location of an object in the image, or motion estimation of the one or more objects in the image.

3. The method of claim 1, further comprising, performing, at the image sensor processor, operations, wherein the operations comprise one or more of channel resampling, Bayer filtering, color interpolation, color correction, gamma correction, color space conversion, or image scaling.

4. The method of claim 1, wherein the pre-encoding analysis utilizes fixed-function hardware.

5. The method of claim 1, wherein the pre-encoding analysis utilizes one or more elements of the image sensor processor other than fixed-function hardware, the one or more elements including an inference processing unit.

6. The method of claim 1, wherein the input video data is a video stream that comprises at least one of camera image data and non-camera image data.

7. The method of claim 5, wherein the input video data is a video stream that comprises non-camera image data, and
wherein the non-camera image data comprises at least one of image data from a video game, image data from screen sharing or transcoded image data.

8. The method of claim 1, wherein the video data is obtained from a camera.

9. A device comprising:
an image sensor processor configured to process raw image sensor data; and
an encoder;
wherein the image sensor processor is configured to perform a pre-encoding analysis on input video data to generate encoding hint metadata, the encoding hint metadata comprising at least one of: a per-region importance map, an object mask identifying one or more objects in an image of the input video data, or motion information for the one or more objects; and wherein the encoder is configured to encode the input video data to encoded video data based on the encoding hint metadata received from the image sensor processor.

10. The device of claim 9, wherein the pre-encoding analysis comprises performing one or more of determining an importance level of one or more regions of an image of the input video data, determining a location of an object in the image, or motion estimation of the one or more objects in the image.

11. The device of claim 9, wherein the image sensor processor is further configured to perform operations, wherein the operations comprise one or more of channel resampling, Bayer filtering, color interpolation, color correction, gamma correction, color space conversion, or image scaling.

12. The device of claim 9, wherein the pre-encoding analysis utilizes fixed-function hardware.

13. The device of claim 9, wherein the pre-encoding analysis utilizes one or more elements of the image sensor processor other than fixed-function hardware, the one or more elements including an inference processing unit.

14. The device of claim 9, wherein the input video data is a video stream that comprises at least one of camera image data and non-camera image data.

15. The device of claim 13, wherein the input video data is a video stream that comprises non-camera image data, and
wherein the non-camera image data comprises at least one of image data from a video game, image data from screen sharing or transcoded image data.

16. The device of claim 9, wherein the video data is obtained from a camera.

17. A system comprising:
a camera configured to obtain raw image sensor data;
an image sensor processor configured to process the raw image sensor data to generate processed sensor data; and
an encoder;
wherein the image sensor processor is configured to perform a pre-encoding analysis on input video data derived from the processed sensor data to generate encoding hint metadata, the encoding hint metadata comprising at least one of: a per-region importance map, an object mask identifying one or more objects in an image of the input video data, or motion information for the one or more objects; and
wherein the encoder is configured to encode the input video data to encoded video data based on the encoding hint metadata received from the image sensor processor.

18. The system of claim 17, wherein the pre-encoding analysis comprises performing one or more of determining an importance level of one or more regions of an image of the input video data, determining a location of an object in the image, or motion estimation of the one or more objects in the image.

19. The method of claim 1, wherein the encoding includes at least one of: applying region-wise quantization parameter adjustments derived from the per-region importance map, selecting block or tile partition boundaries aligned to boundaries of the object mask, or initializing motion estimation using the motion information.

20. The device of claim 9, wherein the input video data is encoded by performing at least one of: applying region-wise quantization parameter adjustments derived from the per-region importance map, selecting block or tile partition boundaries aligned to boundaries of the object mask, or initializing motion estimation using the motion information.

* * * * *